Dec. 9, 1958     E. E. TODD     2,863,805
PROCESS FOR THE PRODUCTION OF OLEORESIN
Filed Dec. 6, 1954
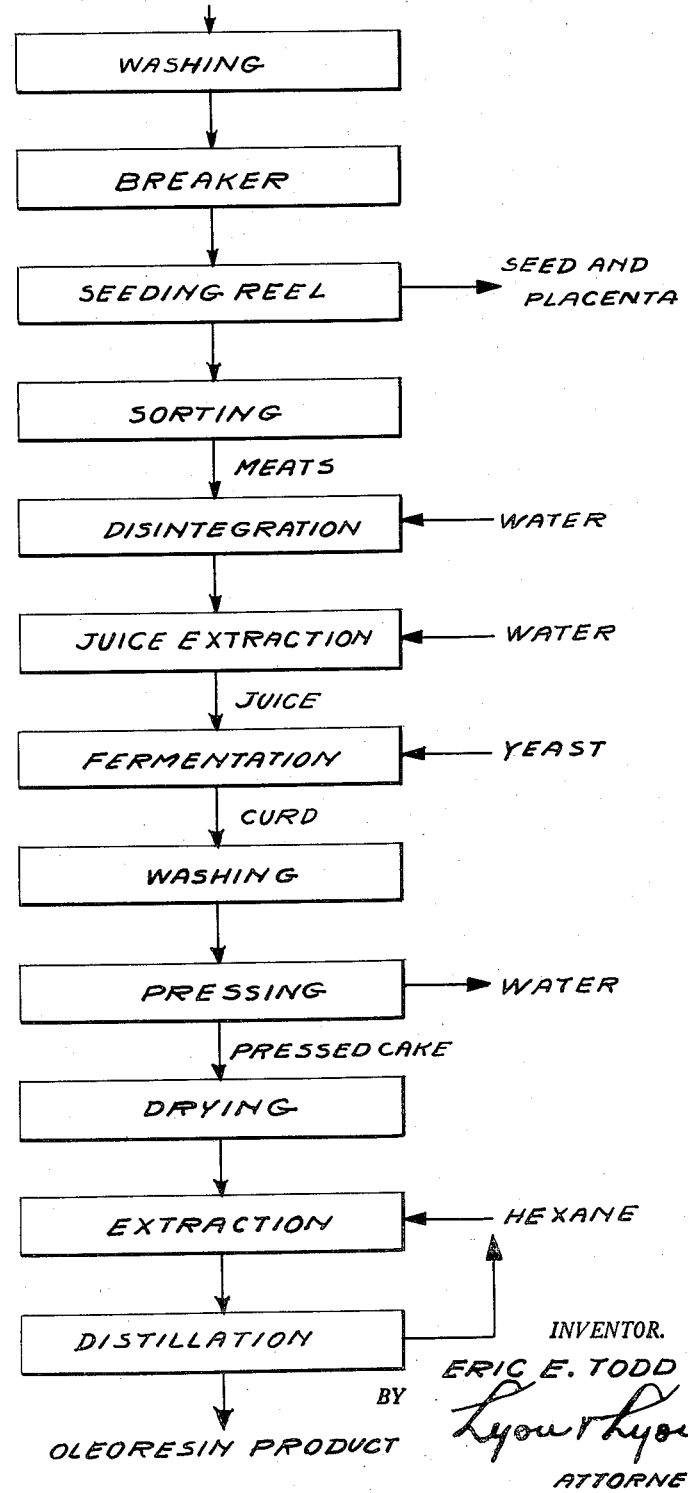
INVENTOR.
ERIC E. TODD
BY
ATTORNEYS

United States Patent Office 2,863,805
Patented Dec. 9, 1958

2,863,805

PROCESS FOR THE PRODUCTION OF OLEORESIN

Eric E. Todd, Malibu, Calif., assignor to Ventura Farms Frozen Foods, Incorporated, Oxnard, Calif., a corporation of California Application December 6, 1954, Serial No. 473,099

15 Claims. (Cl. 195—4)

This invention relates to the production of oleoresin and has particular reference to the production of oleoresin color from edible vegetables.

One of the principal objects of this invention is to provide a novel process for the production of oleoresin color from vegetables such as fresh peppers, bell peppers, California and Mexican chile, pimiento and paprika, the process also being applicable to recovery of the color bodies in tomatoes, and carotene in carrots.

Conventional oleoresin paprika has heretofore been produced from a high priced product which must be seeded, stemmed and dry-ground before extraction. The high sugar content of this dried product greatly hinders the extraction process due to the formation of emulsions. A principal object of this invention is to provide a simple and inexpensive process for producing an oleoresin equivalent to the paprika but utilizing fresh peppers and the like as the raw material.

It has been found that vegetable protein can be denatured (coagulated) by controlled fermentation to form a rubbery mass with the vegetable fibre which entraps the oleoresin, forming an insoluble curd. The rubbery curd can be washed and compressed to squeeze out, without loss of the oleoresin color, water containing the soluble solids such as sugar, acids and even the hot capsicum principle, thus permitting the use of hot chile as well as mild peppers. The curd is preferably hardened and rendered more non-dispersible by the addition of calcium sulfate, preferably in the form of pure plaster of Paris to bring about the removal of residual water through chemical combination.

The semi-dry cake after pressing can be completely dried or mixed with an equal weight of plaster of Paris without drying, and extraction of either product with a suitable solvent gives the oleoresin end product.

The process of this invention permits extraction of considerably less material (15–45% less) than is the case with the conventional dry pepper extractions, and hence the equipment requirements of the process of this invention are considerably lessened. Due to the reduced cake for extraction, less solvent is discarded with the residues and due to the elimination of the water solubles prior to extraction the extraction is accelerated and troublesome emulsions are avoided. The process permits the utilization of "sort outs" or waste material as the raw material. Accordingly, it is a further object of this invention to provide a process for the production of superior color oleoresin at lower costs and in higher yields than has heretofore been possible.

Other objects and advantages of this invention it is believed will be readily apparent from the following detailed description of preferred embodiments thereof when read in connection with the accompanying drawing.

The single figure of the drawing is a flow sheet illustrating a preferred embodiment of the process of this invention.

The present invention is illustrated by the following specific examples, but it is not intended to limit the invention thereto:

*Example 1*

The process of this example is illustrated in the accompanying flow sheet, and consists of the following steps:

(1) 1,000 pounds of fresh, ripe California chilies were washed in a rotary screen with high pressure sprays to disintegrate rotten areas and thoroughly remove all dirt and foreign matter. Other peppers such as Mexican chile, bell, pimiento, paprika and mixtures thereof may be used if desired.

(2) The peppers were passed through a spiked breaker (ice crusher) to break open the peppers and to liberate seeds and stems.

(3) The broken peppers were passed into a rotary reel with approximately 1-inch perforations revolving at about 25 R. P. M. so that almost all seeds are eliminated as well as much of the placenta and stems without the use of water which would tend to remove excessive amounts of the oleoresin-bearing juice.

(4) The seeded peppers are sorted on a conveyor belt to remove stems, leaves and green peppers, chlorophyll being undesirable in the oleoresin product.

(5) The sorted pepper meats were pulped in a high-speed disintegrator such as a Rietz with a fine screen of one-eighth inch perforations to insure a thorough breakdown of the cellular structure. Water is added at this point to the disintegrator but should be restricted to about 25% of the pepper weight.

(6) The pulped peppers were fed into a screw type finisher (juice extractor) with an .020 inch screen. The extractor rejects skin particles, coarse pulp and seeds giving a fluid opaque juice of bright red color. More water was used here but the final juice dilution should not greatly exceed 50%. A continuous centrifuge or continuous press could be used with advantage to replace the juice extractor. When the total water added is equal in volume to the juice, later fermentation is retarded. If no water is used, the efficiency of oleoresin recovery is reduced and more washing is required to reduce sugars in the curd.

(7) The expressed pepper juice with wash water as noted was warmed to 85° F. and placed in a wooden tank. Natural yeast and bacteria usually present in the peppers will cause an active alcoholic, lactic acid fermentation, but to ensure consistent results, four oz. of edible yeast was added and the exothermic fermentation readily maintains temperature without the addition of more external heat. A minimum fermentation time of ten hours is required to insolubilize the proteins, fatty constituents and color bodies, which appear on the surface as a rubbery curd. A stable insoluble complex is formed, which allows washing and pressing to remove water, without loss of the color bodies. About 300 lbs. of wet curd was obtained from the fermented liquor. The amount of added yeast should be less than about 0.1%, based on the original 1000 lbs. of peppers.

Although the pulped juice will ferment and form a curd between 70° F. and 120° F., at low temperatures, mold tends to grow rapidly destroying color, while at high temperatures too much agitation disperses the curd. It should be noted that only a superficial fermentation takes place, since the soluble solids do not greatly decrease in the period stated. Periods of time beyond 18 hrs. tend to allow sinking of the curd and mold production.

(8) The curd was shovelled off the surface of the vat, mixed with water and placed upon a screen to drain. Here it was washed a number of times with hot water 125° F. until the filtrate appeared clear, showing yeast had been eliminated, which is also an indication of sugar removal.

Another method to handle the curd at this point is to drain off the clear liquor beneath curd, refill the tank with water, agitate and then gently pump or allow gravity flow onto the drainage screen or belt. A screen belt passing under sprays results in a satisfactory product with less labor.

(9) The washed curd was then pressed in a hydraulic press to remove water and most of the remaining soluble constituents. The resulting cake weighed 100 lbs., representing a removal of water equal to 74% from the drained curd.

Other methods of moisture reduction would be by centrifuging or by use of a continuous press. The amount of water removal given is a maximum, less than 50% removal should be avoided. The texture of the curd due to its oily nature offers considerable resistance to fast water removal although slow steady pressure expresses only a clear juice.

(10) The pressed cake was dried rapidly in a rotary drier at 125° F. to produce a dark red product weighing 30 lbs. This represents a 33⅓ fold concentration of the oleoresin present in the fresh peppers. An analysis of such an average cake showed:

| | Percent |
|---|---|
| Moisture | 6.5 |
| Protein | 15.0 |
| Fibre | 25.0 |
| Carbohydrate | 28.0 |
| Ash | 5.0 |
| Oleoresin | 20.0 |

Color potency 45,000 units. (Cobalt, chromate comparison method.)

Peppers normally possess 8–14% soluble solids. Due to the separation in fermentation and the rubbery nature of the curd, which allows ample washing, less than 10% of the total soluble solids appear in the dry cake.

If chile such as the California or Mexican type is used, the capsicum heat principle becomes eliminated in the water due to its water solubility. Hence the heat principle accompanies the sugars and it is possible to produce a product similar to that given by paprika.

(11) The dried cake was extracted with hexane to give a dark red solution. For extraction a tank with tight cover and a circulating pump was used. The 30 lbs. of dried cake were placed in the tank and 150 lbs. of hexane added. Slow circulation was allowed for 7 or 8 hours, after which the solution was removed and fresh solvent added. Usually three extractions make a satisfactory leaching. The resulting oleoresin solution was placed in a standard still with condenser. The distillate was reused for extractions and the residue was withdrawn as oleoresin, which was purified by heating and the addition of a small amount of quick lime to remove water. Redissolving of the dried oleoresin, followed by filtration and distillation of the solvent resulted in 6 lbs. of dark red oleoresin color.

The dried cake represents the handling of 30 lbs. of dry cake for extraction versus a weight of 200 lbs. of dry paprika by the present dry extraction process. In addition, the following advantages over the conventional dry extraction process are obtained:

(1) Sugars do not hinder the extraction.
(2) The texture is more porous.
(3) There is less loss of solvent since the lesser weight of dried cake retains less solvent than the much greater weight of paprika.
(4) The actual recoverable oil is greater in the fresh peppers and its color is of higher grade.
(5) The dried cake is marketable without extraction since it exceeds the present color requirements of commercial oleoresin paprika. If sterilized by heat or ethylene oxide, it can be ground and mixed with an officially permitted oil soluble antioxidant such as butylated hydroxy toluene or one of the tocopherols.

The extraction process may utilize a number of solvents and mixed solvents of which hexane (petroleum ether), alcohol (ethyl or isopropyl) and acetone are cheap and efficient.

Other types of extractions would involve the use of vacuum and continuous extraction, whereby a still supplies fresh solvent, which is pumped through the dried or gypsum cake and the return solution is concentrated in the still. When the extraction is completed, the solvent is removed from the still to obtain the oleoresin. A vacuum applied to the cake also recovers solvent from it.

*Example 1a*

The process of this example was the same as that described in Example 1, except that prior to pressing of the washed curd (step 9), 5% by weight of plaster of Paris (gypsum heated to remove 75% of its water of crystallization) was added to the curd. The plaster of Paris had a powerful hardening effect on the curd protein, causing it to shrink, harden, and permitting very rapid expression of the water content. The quantity of plaster of Paris may be varied within the approximate range of 1–20% by weight.

After removal of water in the press, more plaster of Paris may be added to the moist cake, up to two-fold in amount, resulting in a flour-like product. Extraction of this product with hexane may be made without drying the pressed cake.

*Example 2*

The processes of Examples 1 and 1a may be modified by peeling of the peppers either by flame, steam or hot lye. This eliminates the need for the disintegrator and finisher and removes the source of waxes in the final oleoresin product. Such a process is as follows:

(1) The peppers were washed as in Example 1.
(2) The washed peppers were peeled in a high pressure rotary steam peeler, followed by adequate water washing to remove peel.

The remaining steps were identical to those in Example 1 (plaster of Paris may be used as in Example 1a, if desired), except that the pepper meats were pulped in a paddle-type super pulper which eliminates any seeds, stems, skins or foreign material. Additionally, the oleoresin produced by the extraction need not be redissolved since the waxes were removed on the skins.

*Example 3*

The process of this invention has been applied to carrots for the recovery of carotene as follows:

(1) 1,000 lbs. of carrots were machine trimmed to remove green stem ends.
(2) They were washed and inspected.
(3) They were crushed in a rotary spike mill (attrition mill) and fed to a Rietz disintegrator with not more than an equal weight of water.
(4) The resulting carrot pulp was fermented as in Example 1 and the curd removed for washing and pressing. The most pressed cake weighed about 35 lbs. The use of plaster of Paris is also an advantage here.
(5) Drying of the cake resulted in a weight of 12 lbs.; however, due to the sensitivity of carotene to heat and oxidation, it is preferred to add three gallons of alkaline methanol to the moist cake and a gallon of petroleum ether. Due to ready solubility of the carotene in the petroleum ether, it is removed leaving water and green pigments with the methanol. Final evaporation by distillation of the separated petroleum ether solution resulted in the production of about one ounce of carotene in crystalline form.

Example 4

The process of this invention has been applied to tomatoes with excellent results, as follows:

(1) 1,000 lbs. of ripe tomatoes were washed and sorted.

(2) The tomatoes were fed to a paddle type pulper to reject skin, seeds and stems and provide a tomato puree.

(3) The puree was fermented as in Example 1 to yield a curd (80 lbs.) which required only about 1% of plaster of Paris for excellent moisture removal, the resulting pressed cake weighing 30 lbs.

(4) The cake, after drying as in Example 1, weighed 10 lbs. and yielded 3 lbs. of tomato oleoresin color after extraction as in Example 1.

Having fully described my invention, it is to be understood that I do not wish to be limited to the details set forth, but my invention is of the full scope of the appended claims.

I claim:

1. A process for the production of color bodies from fresh vegetables selected from the group consisting of peppers, pimientoes, paprika, tomatoes and carrots comprising the steps of extracting the juice and pulp therefrom, heating said juice and pulp to a temperature between about 70° and 120° F. to bring about fermentation and the formation of a curd by insolubilization of the proteins, fatty constituents and color bodies present, and removing the water and water soluble constituents from said curd.

2. A process for the production of color bodies from fresh vegetables selected from the group consisting of peppers, pimientoes, paprika, tomatoes and carrots comprising the steps of extracting the juice and pulp therefrom, heating said juice and pulp to a temperature between about 70° and 120° F. to bring about fermentation and the formation of a curd by insolubilization of the proteins, fatty constituents and color bodies present, washing said curd with water, adding gypsum to said curd, and removing the water and water soluble constituents from said curd.

3. A process for the production of color bodies from fresh vegetables selected from the group consisting of peppers, pimientoes, paprika, tomatoes and carrots comprising the steps of extracting the juice and pulp therefrom, heating said juice and pulp to a temperature between about 70° and 120° F. to bring about fermentation and the formation of a curd by insolubilization of the proteins, fatty constituents and color bodies present, washing said curd with water, removing the water and water soluble constituents from said curd, drying said curd, and extracting the color bodies from said curd with a solvent.

4. A process for the production of color bodies from fresh vegetables selected from the group consisting of peppers, pimientoes, paprika, tomatoes and carrots comprising the steps of extracting the juice and pulp therefrom, heating said juice and pulp to a temperature between about 70° and 120° F. to bring about fermentation and the formation of a curd by insolubilization of the proteins, fatty constituents and color bodies present, washing said curd with water, adding gypsum to said curd, removing the water and water soluble constituents from said curd, and extracting the color bodies from said curd with a solvent.

5. A process for the production of color bodies from fresh vegetables selected from the group consisting of peppers, pimientoes, paprika, tomatoes and carrots comprising the steps of extracting the juice and pulp therefrom, heating said juice and pulp to a temperature between about 70 and 120° F. and adding a minor proportion of yeast thereto to bring about fermentation and the formation of a curd by insolubilization of the proteins, fatty constituents and color bodies present, and removing the water and water soluble constituents from said curd.

6. A process for the production of color bodies from fresh vegetables selected from the group consisting of peppers, pimientoes, paprika, tomatoes and carrots comprising the steps of extracting the juice and pulp therefrom, heating said juice and pulp to a temperature between about 70° and 120° F. and adding a minor proportion of yeast thereto, maintaining said temperature for a period of time sufficient to bring about fermentation and the formation of a curd by insolubilization of the proteins, fatty constituents and color bodies present, washing said curd with water, adding gypsum to said curd, and pressing said curd to remove the water and water soluble constituents and form a cake.

7. A process for the production of color bodies from fresh vegetables selected from the group consisting of peppers, pimientoes, paprika, tomatoes and carrots comprising the steps of extracting the juice and pulp therefrom, heating said juice and pulp to a temperature of about 85° F. and adding less than about 1% by weight, based on the original weight of vegetables used, of yeast, maintaining said temperature for about 10–18 hours to bring about fermentation and the formation of a curd by insolubilization of the proteins, fatty constituents and color bodies present, washing said curd with water, adding from about 1% to about 20%, based on the wet curd, of plaster of Paris, pressing said curd to remove the water and water soluble constituents and form a cake, extracting the color bodies from said cake with hexane, and distilling said extraction.

8. A process for the production of color bodies from fresh vegetables selected from the group consisting of peppers, pimientoes, paprika, tomatoes and carrots comprising the steps of extracting the juice and pulp therefrom, heating said juice and pulp to a temperature of about 85° F. and adding less than about 1% by weight, based on the original weight of vegetables used, of yeast, maintaining said temperature for about 10–18 hours to bring about fermentation and the formation of a curd by insolubilization of the proteins, fatty constituents and color bodies present, washing said curd with water, pressing said curd to remove the water and water soluble constituents and form a cake, drying said cake, extracting the color bodies from said cake with hexane, and distilling said extraction.

9. A process for the production of color bodies from fresh vegetables selected from the group consisting of peppers, pimientoes, paprika, tomatoes and carrots, comprising the steps of extracting the juice and pulp therefrom, heating said juice and pulp to a temperature between about 70° and 120° F. for a period of about 10–18 hours to bring about fermentation and the formation of a curd by insolubilization of the proteins, fatty constituents and color bodies present, and removing the water and water soluble constituents from said curd.

10. A process for the production of color bodies from fresh vegetables selected from the group consisting of peppers, pimientoes, paprika, tomatoes and carrots, comprising the steps of extracting the juice and pulp therefrom, heating said juice and pulp to a temperature between about 70° and 120° F. for a period of about 10–18 hours to bring about fermentation and the formation of a curd by insolubilization of the proteins, fatty constituents and color bodies present, washing said curd with water, adding gypsum to said curd, and removing the water and water soluble constituents from said curd.

11. A process for the production of color bodies from fresh vegetables selected from the group consisting of peppers, pimientoes, paprika, tomatoes and carrots, comprising the steps of extracting the juice and pulp therefrom, heating said juice and pulp to a temperature between about 70° and 120° F. for a period of about 10–18 hours to bring about fermentation and the formation of a curd by insolubilization of the proteins, fatty constituents and color bodies present, washing said curd with water, removing the water and water soluble constituents from said curd, drying said curd, and extracting the color bodies from said curd with a solvent.

12. A process for the production of color bodies from fresh vegetables selected from the group consisting of peppers, pimientoes, paprika, tomatoes and carrots, comprising the steps of extracting the juice and pulp therefrom, heating said juice and pulp to a temperature between about 70° and 120° F. for a period of about 10–18 hours to bring about fermentation and the formation of a curd by insolubilization of the proteins, fatty constituents and color bodies present, washing said curd with water, adding gypsum to said curd, removing the water and water soluble constituents from said curd, and extracting the color bodies from said curd with a solvent.

13. A process for the production of color bodies from fresh vegetables selected from the group consisting of peppers, pimientoes, paprika, tomatoes and carrots, comprising the steps of extracting the juice and pulp therefrom, heating said juice and pulp to a temperature between about 70° and 120° F. for a period of about 10–18 hours and adding a minor proportion of yeast thereto to bring about fermentation and the formation of a curd by insolubilization of the proteins, fatty constituents and color bodies present, and removing the water and water soluble constituents from said curd.

14. A process for the production of color bodies from fresh vegetables selected from the group consisting of peppers, pimientoes, paprika, tomatoes and carrots, comprising the steps of extracting the juice and pulp therefrom, adding a minor proportion of yeast thereto, heating said juice and pulp to a temperature between about 70° and 120° F. for a period of about 10–18 hours to bring about fermentation and the formation of a curd by insolubilization of the proteins, fatty constituents and color bodies present, washing said curd with water, adding gypsum to said curd, and pressing said curd to remove the water and water soluble constituents and form a cake.

15. A process for the production of color bodies from fresh vegetables selected from the group consisting of peppers, pimientoes, paprika, tomatoes and carrots, comprising the steps of extracting the juice and pulp therefrom, adding a minor proportion of yeast thereto, heating said juice and pulp to a temperature between about 70° and 120° F. for a period of about 10–18 hours to bring about fermentation and the formation of a curd by insolubilization of the proteins, fatty constituents and color bodies present, washing said curd with water, pressing said curd to remove the water and water soluble constituents and form a cake, drying said cake, and extracting the color bodies therefrom with a solvent.

References Cited in the file of this patent

UNITED STATES PATENTS

| | | |
|---|---|---|
| 187,612 | Ward Baking Co. | of 1922 |
| 2,074,441 | Van Sant | Mar. 23, 1937 |
| 2,131,394 | Test | Sept. 27, 1938 |
| 2,384,532 | Bush | Sept. 11, 1945 |
| 2,530,322 | Ash | Nov. 14, 1950 |

FOREIGN PATENTS

| | | |
|---|---|---|
| 1,551 | Great Britain | of 1886 |

OTHER REFERENCES

Ser. No. 348,557, Mauri (A. P. C.) published Apr. 20, 1943.